(12) United States Patent
Kester

(10) Patent No.: US 7,730,962 B1
(45) Date of Patent: Jun. 8, 2010

(54) ADJUSTABLE SCRAPER ASSEMBLY FOR PLANTER GAUGE WHEELS

(76) Inventor: Philip C. Kester, 3802 Jean St., East Moline, IL (US) 61244

(*) Notice: Subject to any disclaimer, the term of this patent is extended or adjusted under 35 U.S.C. 154(b) by 110 days.

(21) Appl. No.: 12/053,531

(22) Filed: Mar. 21, 2008

Related U.S. Application Data

(60) Provisional application No. 60/919,467, filed on Mar. 21, 2007.

(51) Int. Cl.
  A01B 15/16 (2006.01)
  A01B 19/10 (2006.01)
  A01B 23/00 (2006.01)
  A01B 35/20 (2006.01)
  A01B 39/20 (2006.01)

(52) U.S. Cl. ................... 172/558; 172/610

(58) Field of Classification Search ......... 172/558–566, 172/606, 610
See application file for complete search history.

(56) References Cited

U.S. PATENT DOCUMENTS

| | | | | |
|---|---|---|---|---|
| 2,730,940 | A | * | 1/1956 | Rimple .................. 172/558 |
| 2,901,049 | A | * | 8/1959 | De Haai ................. 172/558 |
| 2,949,968 | A | * | 8/1960 | Stoner .................. 172/166 |
| 3,045,765 | A | * | 7/1962 | Cox et al. .............. 172/212 |
| 3,139,938 | A | * | 7/1964 | Parrish et al. ............ 171/58 |
| 3,261,411 | A | * | 7/1966 | Youngberg et al. ....... 172/559 |
| 3,833,067 | A | * | 9/1974 | Peterson et al. ......... 172/566 |
| 4,008,770 | A | * | 2/1977 | Boone et al. ........... 172/566 |
| 4,113,030 | A | * | 9/1978 | Walker ................. 172/566 |
| 4,127,179 | A | * | 11/1978 | Heersink et al. ......... 172/565 |
| 4,330,041 | A | * | 5/1982 | Ankenman .............. 172/566 |
| 4,489,787 | A | * | 12/1984 | Gary .................... 172/1 |
| 5,060,586 | A | * | 10/1991 | Hoyt ................... 111/164 |
| 5,269,380 | A | | 12/1993 | Lofquist et al. |
| 5,297,497 | A | | 3/1994 | Schmidt |
| 5,318,133 | A | * | 6/1994 | Logue .................. 172/560 |
| 5,431,233 | A | | 7/1995 | Schmidt |
| 5,443,125 | A | | 8/1995 | Clark et al. |
| 5,884,711 | A | | 3/1999 | Shoup |
| 6,260,632 | B1 | * | 7/2001 | Bourgault et al. ........ 172/566 |
| 6,347,594 | B1 | * | 2/2002 | Wendling et al. ......... 111/167 |
| 2008/0029280 | A1 | * | 2/2008 | Meidinger ............. 172/559 |

OTHER PUBLICATIONS

R K Products Inc., East Moline, IL, "Gauge Wheel Rotary Mud Scraper," promotional brochure, Feb. 11, 2001.

(Continued)

*Primary Examiner*—Christopher J. Novosad
(74) *Attorney, Agent, or Firm*—Jeffrey L. Thompson; Thompson & Thompson, PA

(57) ABSTRACT

An adjustable scraper assembly for clearing mud and trash from the gauge wheel tires of an agricultural planter includes a support rod connected to the planter, a clamp assembly attached to the support rod, and a scraper blade attached to the clamp assembly. The clamp assembly has first and second clamping blocks that function together to allow pivotal adjustment of the scraper blade relative to the support rod about three nonparallel axes of rotation and sliding adjustment along at least one linear direction relative to the support rod. The support rod is attached to the planter using a third clamping block clamped to the hub of a gauge wheel arm. The third clamping block can be used to provide an additional adjustment of the support rod relative to the gauge wheel arm.

15 Claims, 4 Drawing Sheets

OTHER PUBLICATIONS

R K Products Inc., East Moline, IL, "Instructions for Installing the R K Mud Scrapers," instruction sheet, Apr. 30, 2003.

R K Products Inc., East Moline, IL, "Gauge Wheel Mud Scrapers for John Deere and Kinze Planters," promotional brochure, Jan. 9, 2004.

R K Products Inc., East Moline, IL, "Instructions for Installing R K P Mud Scrapers on John Deere and Kinze Planters," instruction sheet, Aug. 15, 2005.

R K Products Inc., East Moline, IL, "Gauge Wheel Mud Scrapers for John Deere and Kinze Planters," promotional brochure, Aug. 23, 2005.

* cited by examiner

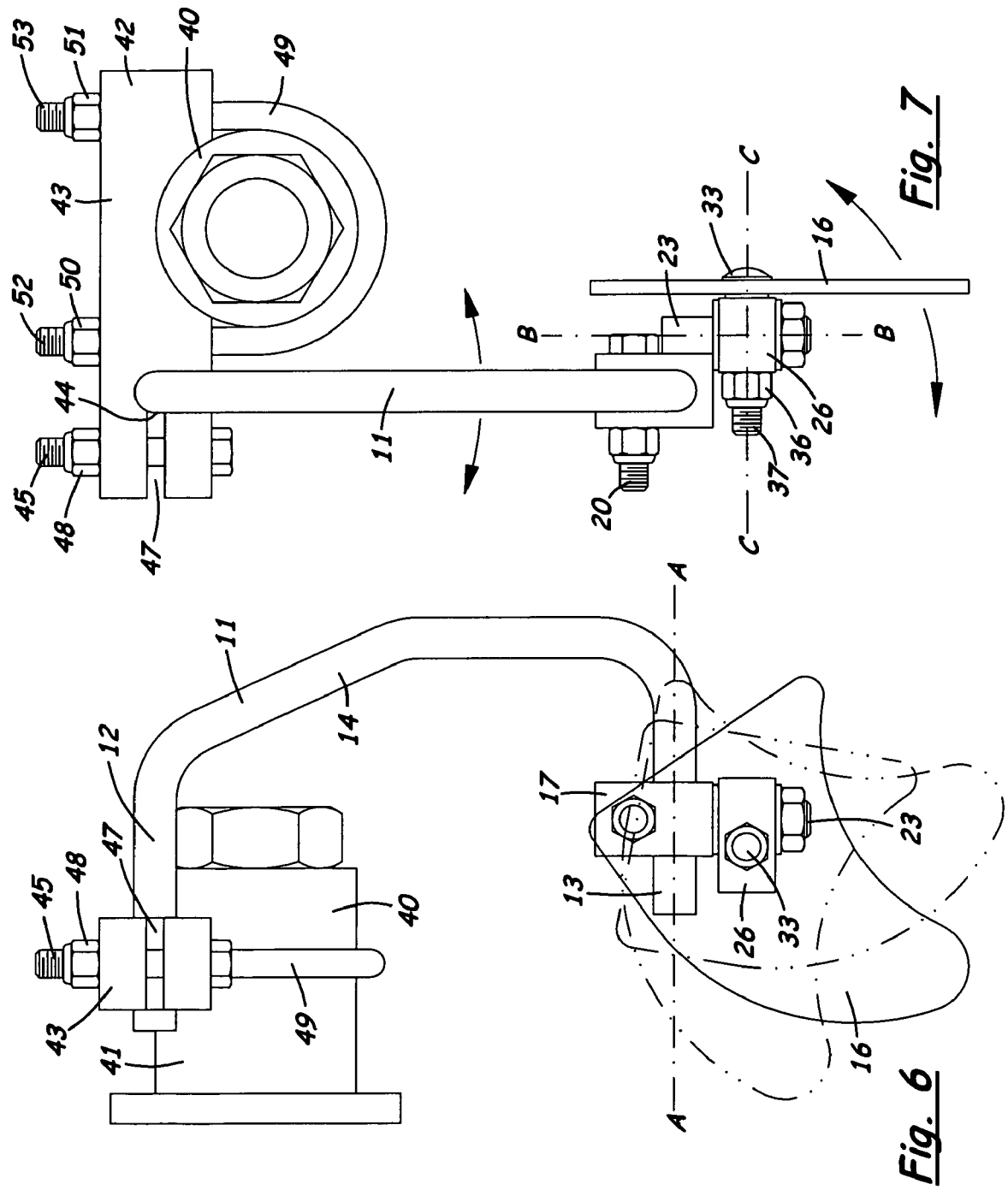

ADJUSTABLE SCRAPER ASSEMBLY FOR PLANTER GAUGE WHEELS

RELATED APPLICATIONS

This application claims priority of U.S. Provisional Application No. 60/919,467 filed on Mar. 21, 2007. The entire content of this prior application is incorporated herein by reference.

BACKGROUND OF THE INVENTION

1. Field of the Invention

The present invention relates generally to agricultural planters. In particular, the present invention relates to adjustable mud scraper systems for gauge wheels of agricultural planters.

2. Description of the Related Art

R K Products Inc. introduced a gauge wheel rotary mud scraper for planters in 2001. The rotary mud scraper was designed for severe hair pinning conditions in which small pieces of leaves or stalks tend to bend over the scraping edge of stationary scraper blades and accumulate to the point where the scraper no longer functions. Excessive pressure between the blade and wheel can even prevent the wheel from turning.

The mounting system for the rotary mud scraper included a pivot bracket and a support rod. The pivot bracket was made to clamp to the hub of the gauge wheel arm with a U-bolt. Milled surfaces were also provided to conform to the hub surface of more recently produced arms, and cone-point set screws were sometimes used to ensure that the pivot bracket was securely clamped to the hub of the gauge wheel arm.

With this mounting system, the support rod was clamped to the pivot bracket, which was in turn clamped to the hub of the gauge wheel arm. The support rod was adjustable laterally and rotationally relative to the pivot bracket. The lower end of the support rod provided a clamping point for the bearing support of the rotor assembly. The rotor assembly could also be adjusted laterally and rotated around the lower end of the support rod.

The support rod was typically formed as a generally U-shaped member with upper and lower ends spaced about from each other and connected by an intermediate portion. This configuration helped eliminate restrictions on the flow of mud coming off the tire.

It was recognized that a more traditional style flat scraper blade could be easily mounted in place of the rotary scraper, so a flat scraper was added as an option. The flat scraper blade was clamped to the lower end of the support rod with a small U-bolt. This mounting allowed the blade to be rotated around the support rod and adjusted laterally.

It was soon recognized that the blade needed to be adjustable in its own plane to allow the blade to fit the profile of the tire better. For that reason a small clamping block was introduced that allowed the blade to be rotated about the lower end of the support rod and about the center axis of the bolt used to attach the blade to the clamping block.

The rotary scraper was quite expensive and sales were moderate. For that reason a V-blade was introduced as a low cost alternative to remove mud from the load carrying portion of the tire profile with a scraping edge that would allow trash to be pushed off without hair pinning.

The V-blade was effective but excessive wear was experienced. Wear was also recognized as a problem on the regular flat blade. For those reasons the flat blade was redesigned with stronger material and a different shape to improve operation in severe hair pinning conditions.

There is a need in the industry for an improved adjustment mechanism for gauge wheel mud scraper systems for agricultural planters.

SUMMARY OF THE INVENTION

An infinitely adjustable scraper assembly is provided for clearing mud and trash from the gauge wheel tires of an agricultural planter. The scraper assembly includes a support rod connected to the planter, a clamp assembly attached to the support rod, and a scraper blade attached to the clamp assembly. The clamp assembly has first and second clamping blocks that function together to allow pivotal adjustment of the scraper blade relative to the support rod about three nonparallel axes of rotation and sliding adjustment along at least one linear direction relative to the support rod. The support rod is attached to the planter using a third clamping block clamped to the hub of a gauge wheel arm. The third clamping block can be used to provide an additional adjustment of the support rod relative to the gauge wheel arm.

According to a broad aspect of the present invention, an adjustable scraper assembly for planter gauge wheels is provided, comprising: a support rod having a first end attached to a planter and a second end spaced from the first end; a first clamp structure clamped to the second end of the support rod, the first clamp structure allowing a sliding adjustment along the support rod and a pivotal adjustment about the support rod; a protrusion member protruding from the first clamp structure in a nonparallel direction relative to the support rod; a second clamp structure attached to the first clamp structure, the second clamp structure allowing a pivotal adjustment about the protrusion member; and a scraper blade attached to the second clamp structure.

According to another broad aspect of the present invention, an adjustable scraper assembly for planter gauge wheels is provided, comprising: a support structure adapted to be attached to a planter; a clamp assembly attached to the support structure; and a scraper blade attached to the clamp assembly for scraping an outer surface of a planter gauge wheel tire. The clamp assembly provides means for pivotally adjusting the scraper blade about three nonparallel axes of rotation and for slidably adjusting the scraper blade in at least one linear direction relative to the support structure.

According to another broad aspect of the present invention, an agricultural planter is provided, comprising: a planter frame; a gauge wheel arm pivotally attached to the planter frame; a gauge wheel attached to the gauge wheel arm; and an adjustable scraper assembly having a scraping edge positioned close to an outer circumference of the gauge wheel. The adjustable scraper assembly includes a support structure attached to the gauge wheel arm; a clamp assembly attached to the support structure; and a scraper blade comprising the scraping edge attached to the clamp assembly. The clamp assembly provides means for pivotally adjusting the scraper blade about three nonparallel axes of rotation and for slidably adjusting the scraper blade in at least one linear direction relative to the support structure.

Numerous other objects of the present invention will be apparent to those skilled in this art from the following description wherein there is shown and described an embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the present invention is made with reference to the accompanying drawings. In the drawings:

FIG. 6 is a rear view of the adjustable scraper assembly mounted on a hub of a gauge wheel arm.

FIG. 7 is a side view of the adjustable scraper assembly mounted on a hub of a gauge wheel arm.

DETAILED DESCRIPTION OF THE INVENTION

Figure 1:
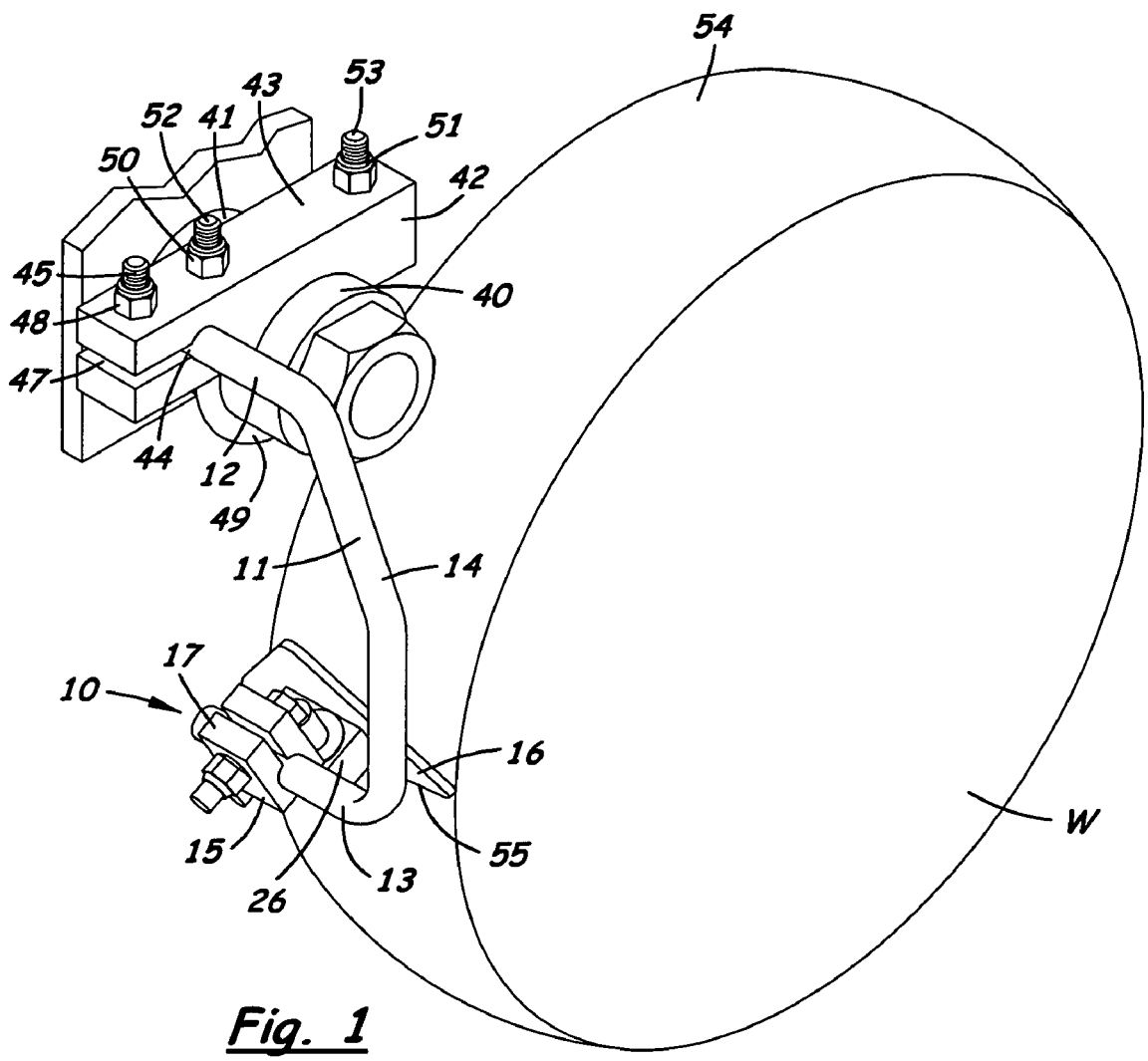
FIG. 1 is a perspective view of an adjustable scraper assembly of the present invention mounted on a planter row unit for scraping an outer surface of a gauge wheel tire.
Figure 2:
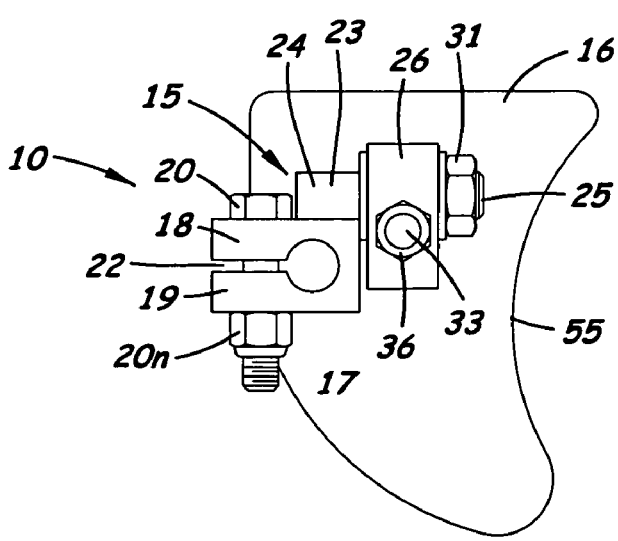
FIG. 2 is a rear view of the adjustable scraper assembly of the present invention.
Figure 3:
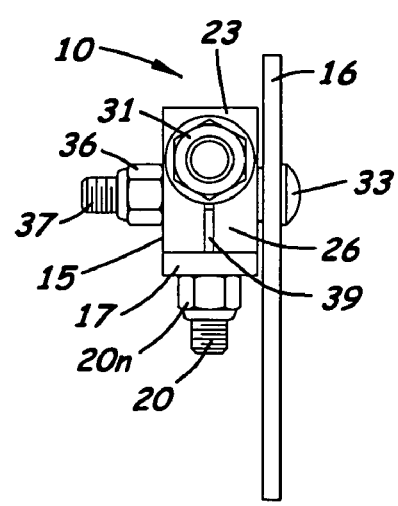
FIG. 3 is a side view of the adjustable scraper assembly of the present invention.
Figure 4:
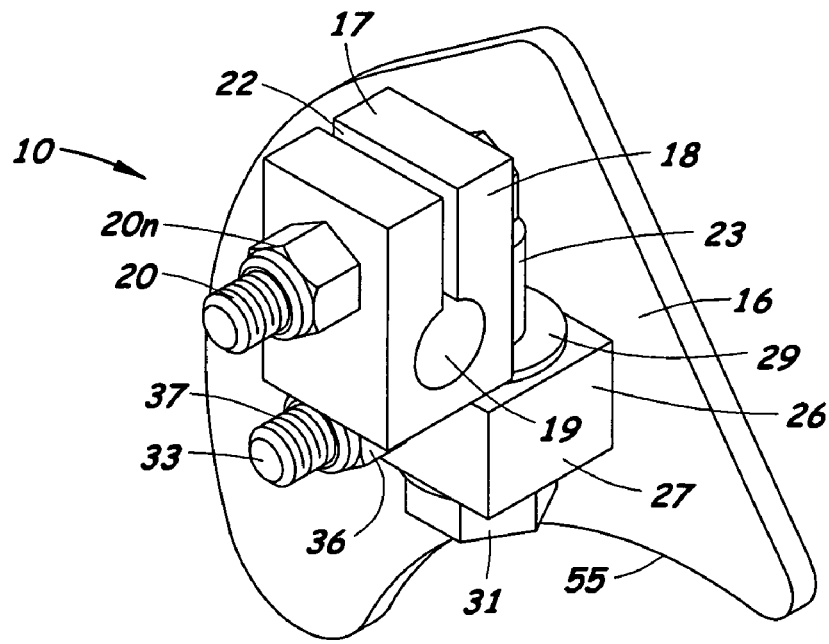
FIG. 4 is a perspective view of the adjustable scraper assembly of the present invention.

An adjustable scraper assembly 10 for clearing mud and trash from planter gauge wheels/tires according to an embodiment of the present invention will now be described with reference to FIGS. 1 to 8 of the accompanying drawings.

The adjustable scraper assembly 10 has been developed for scraping the outer surfaces of planter gauge wheel tires W. However, it should be understood that the same structure could be used for scraping gauge wheels that are not covered by tires (e.g., metal wheels designed to operate without tires). The phrases "gauge wheel" and "gauge wheel tire" are used interchangeably throughout this application to refer to the structures that are scraped by the scraper assembly 10.

The adjustable scraper assembly 10 includes a support rod 11 having a first upper end 12 and a second lower end 13. In the illustrated embodiment, the support rod 11 has a generally U-shaped configuration with the first and second ends 12, 13 spaced apart and generally parallel with each other and an intermediate portion 14 extending between the first and second ends 12, 13.

A triple adjusting clamp assembly 15 is used to attach a scraper blade 16 to the lower end 13 of the support rod 11. The clamp assembly 15 includes a first clamp structure 17 clamped to the lower end 13 of the support rod 11. The first clamp structure 17 has a first clamping block 18 with a first bore 19 extending therethrough for receiving the lower end 13 of the support rod 11. A threaded fastener 20 extends through a second bore 21 perpendicular to the first bore 19 for clamping the first clamping block 18 to the lower end 13 of the support rod 11. The clamping block 18 has a split portion 22 provided on one side to allow a clamping action upon tightening the nut 20n on the threaded fastener 20. The first clamp structure 17 allows sliding lateral adjustment along the lower end 13 of the support rod 11 and pivotal adjustment about the center axis A-A of the support rod 11.

A protrusion member 23 protrudes from the first clamp structure 17 in a perpendicular direction relative to the first bore 19 in the first clamping block 18. The protrusion member 23 in the illustrated embodiment is a threaded stud (e.g., 0.5" diameter) having one end 24 welded to the first clamping block 18 and a threaded end 25 extending from the first clamping block 18 in a perpendicular direction relative to the second end 13 of the support rod 11. In other variations of the invention, the protrusion member 23 can be made to extend in a nonparallel direction other than perpendicular relative to the support rod 11 and still provide at least some of the objectives of the present invention.

Figure 5:
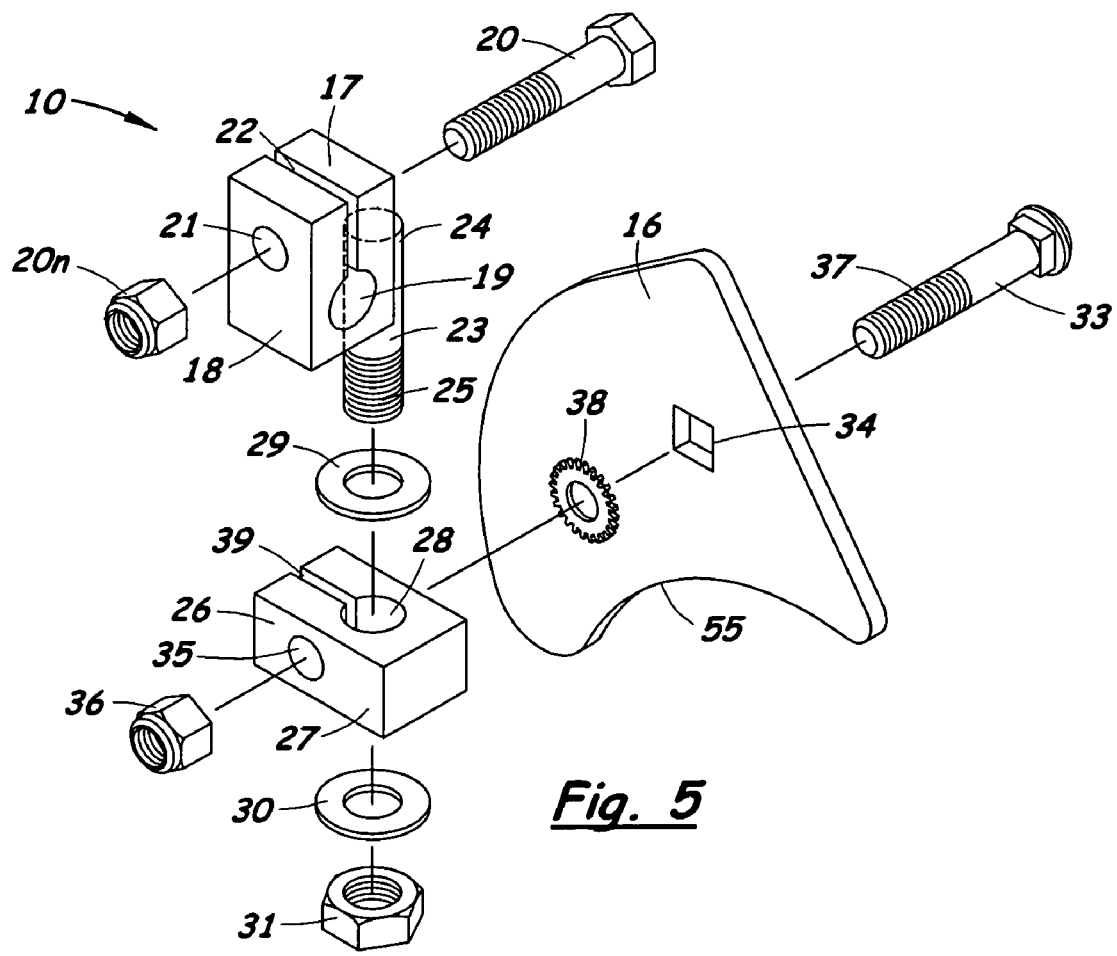
FIG. 5 is an exploded perspective view of the adjustable scraper assembly of the present invention.
Figure 8:
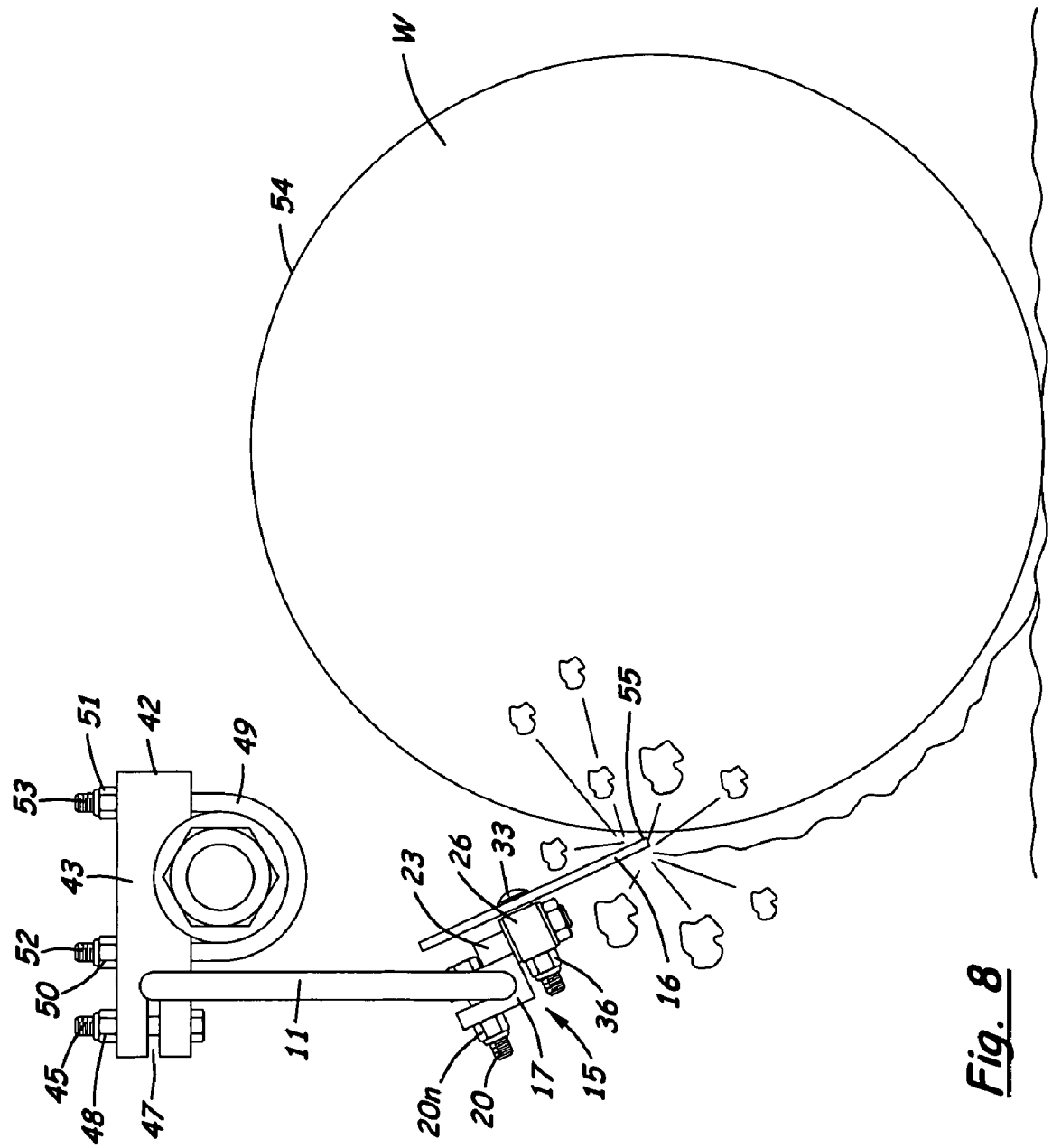
FIG. 8 is a side view of the adjustable scraper assembly showing the scraping action on an outer surface of a planter gauge wheel tire.

A second clamp structure 26 is attached to the protrusion member 23 of the first clamp structure 17. The second clamp structure 26 includes a second clamping block 27 having a first bore 28 extending therethrough for receiving the protrusion member 23. As shown in FIG. 5, flat washers 29, 30 are placed on each side of the second clamping block 27 as the protrusion member 23 passes therethrough, and a nut 31 is threaded onto the threaded end 25 of the protrusion member 23. The second clamping block 27 can be pivotally adjusted about the center axis B-B of the protrusion member 23.

The scraper blade 16 is attached to the second clamp structure 26 using a carriage bolt 33 that extends through a square hole 34 in the scraper blade 16 and through a second bore 35 in the second clamping block 27. A nut 36 is threaded onto the threaded end 37 of the carriage bolt 33 and tightened to secure the scraper blade 16 to the second clamp structure 26. The scraper blade 16 is pivotally adjustable relative to the second clamp structure 26 about a center axis C-C of the carriage bolt. A toothed washer 38 is provided on the carriage bolt 33 between the scraper blade 16 and the second clamping block 27 to help lock the scraper blade 16 in position when the nut 36 is tightened on the carriage bolt 33.

The carriage bolt 33 also provides the clamping force for clamping the second clamping block 27 to the protrusion member 23 in a desired position. The second clamping block 27 has a split portion 39 on one side to allow the clamping action upon tightening the nut 36 on the carriage bolt 33. The first and second bores 28, 35 in the second clamping block 27 are approximately perpendicular to each other. The scraper blade 16 is pivotally adjustable along with the second clamping block 27 about the center axis B-B of the protrusion member 23.

The upper end 12 of the support rod 11 is attached to a hub 40 of a planter gauge wheel arm 41 with a third clamp structure 42. The third clamp structure 42 includes a third clamping block 43 having a first bore 44 extending therethrough for receiving the upper end 12 of the support rod 11. A threaded fastener 45 extends through a second bore perpendicular to the first bore 44 for clamping the first end 12 of the support rod 11 within the first bore 44 of the third clamping block 43. The third clamping block 43 has a split portion 47 on one side to allow a clamping action upon tightening the nut 48 on the threaded fastener 45. The third clamp structure 42 allows a sliding adjustment and a pivotal adjustment of the support rod 11 relative to the third clamping block 43.

The third clamping block 43 is secured to the hub 40 of the gauge wheel arm 41 using a U-shaped clamping bolt 49 that extends around the outer surface of the hub 40 and passes through respective holes in the clamping block 43. A pair of nuts 50, 51 are threaded onto the threaded ends 52, 53 of the U-shaped clamping bolt 49 to securely clamp the block 43 to the hub 40. By attaching the clamping block 43 to the hub 40 of the gauge wheel arm 41, the support rod 11 will move with the gauge wheel W when the gauge wheel arm 41 pivots so that a constant spacing can be maintained between the outer surface 54 of the gauge wheel tire W and the scraper blade 16 attached to the lower end 13 of the support rod 11.

ADVANTAGES

The scraper assembly 10 with the triple adjusting clamp assembly 15 described above allows the scraper blade 16 to be pivotally adjusted about three nonparallel axes of rotation (i.e., axes A-A, B-B and C-C) and slidably adjusted in at least one linear direction along the lower end 13 of the support rod 11. This allows the scraper assembly 10 to be infinitely adjustable so that the scraper blade 16 can be located closer to the outer surface 54 of the gauge wheel tire W than would otherwise be possible. This allows the scraper assembly 10 to be adapted to several different tire profiles on the market using a single style of scraper blade 16.

The inner end of the scraper blade 16 can be rotated between various positions as shown in FIG. 6, while still being adjusted close to the gauge wheel tire surface 54. This allows the scraper blade 16 to be set to reduce the degree to which trash will hair pin over the scraping edge 55 and increase the degree to which trash will be pushed along the edge 55 and ultimately off the edge 55.

Gauge wheel tires are generally not very accurate. There almost always is a high spot or hump in the surface of the tire. When the scraping edge 55 of the scraper blade 16 is approximately horizontal this hump will hit the blade 32 along its entire width, which requires more energy to push the tire past the scraper blade.

When the inner end of the blade 32 is rotated downward the hump will engage the blade gradually thereby requiring less energy. This allows the scraping edge 55 of the scraper blade 16 to be set closer to the tire surface 54.

Without the triple adjusting clamp assembly 15 of the present invention, it was necessary to mount the pivot bracket (i.e., the third clamp structure 42) to some feature of the planter such that the upper end of the support rod 11 is nearly parallel to the axis of rotation of the gauge wheel W. The hub 40 of the gauge wheel arm 41 is such a feature.

However, some planters, such as the White™ 5000, 6000 and 8000 Series planters, have a depth control arm that eliminates the required space to mount the pivot bracket. With the triple adjusting clamp assembly 15 of the present invention it is possible to use a pivot bracket that can be clamped to the depth control arm even though the upper end of the support rod may not be parallel to the axis of rotation of the gauge wheel W.

The triple adjusting clamp assembly 15 also makes it possible to eliminate the lower horizontal end of the support rod 11. The first clamp structure 17 would then be mounted to a portion of the support rod 11 that is not parallel with the center axis of the gauge wheel W (e.g., a nearly vertical portion of the support rod).

The triple adjusting clamp assembly 15 also provides an effective scraper for planters equipped with dual gauge wheels. Dual gauge wheels are mounted such that two wheels are clamped together thus requiring a double length blade. The clamp assembly 15 of the present invention allows the scraper blade to be fully adjustable with the adjusting mechanism close to the center of the blade.

While the invention has been specifically described in connection with specific embodiments thereof, it is to be understood that this is by way of illustration and not of limitation, and the scope of the appended claims should be construed as broadly as the prior art will permit.

What is claimed is:

1. An adjustable scraper assembly for planter gauge wheels, comprising:
   a support rod having a first end attached to a planter and a second end spaced from said first end;
   a first clamp structure clamped to said second end of the support rod, said first clamp structure allowing a sliding adjustment along said second end of said support rod and a pivotal adjustment about a first axis of rotation comprising an axis of said second end of said support rod;
   a protrusion member protruding from said first clamp structure in a nonparallel direction relative to said second end of said support rod;
   a second clamp structure attached to said first clamp structure, said second clamp structure allowing a pivotal adjustment about a second axis of rotation comprising an axis of said protrusion member; and
   a scraper blade attached to said second clamp structure, said scraper blade being attached to said second clamp structure with a threaded fastener that allows pivotal adjustment about a third axis of rotation comprising an axis of the threaded fastener;
   said first, second and third axes of rotation are nonparallel with each other and allow adjustment of said scraper blade about three nonparallel axes of rotation.

2. The adjustable scraper assembly according to claim 1, wherein said first clamp structure comprises a first clamping block having a bore extending therethrough for receiving the second end of the support rod, and a threaded fastener for clamping the first clamping block to the support rod.

3. The adjustable scraper assembly according to claim 1, wherein said protrusion member comprises a threaded stud welded to said first clamp structure and extending from said first clamp structure in a perpendicular direction relative to said support rod.

4. The adjustable scraper assembly according to claim 1, wherein said second clamp structure comprises a second clamping block having a bore extending therethrough for receiving the protrusion member extending from said first clamp structure, and a threaded fastener for clamping the second clamping block to the protrusion member.

5. The adjustable scraper assembly according to claim 1, further comprising a third clamp structure for attaching the first end of the support rod to the planter, said third clamp structure allowing a sliding adjustment and a pivotal adjustment of the support rod relative to said third clamp structure.

6. The adjustable scraper assembly according to claim 5, wherein said third clamp structure comprises a third clamping block having a bore extending therethrough for receiving the first end of the support rod, and a threaded fastener for clamping the first end of the support rod within the bore of the third clamping block.

7. The adjustable scraper assembly according to claim 5, wherein said third clamp structure further comprises a means for securing the third clamping block to a hub of a gauge wheel arm.

8. An adjustable scraper assembly for planter gauge wheels, comprising:
   a support structure adapted to be attached to a planter;
   a clamp assembly attached to said support structure; and
   a scraper blade attached to said clamp assembly for scraping an outer surface of a planter gauge wheel tire;
   said clamp assembly comprising means for pivotally adjusting the scraper blade about three nonparallel axes of rotation and for slidably adjusting the scraper blade in at least one linear direction relative to said support structure;

wherein said support structure comprises a support rod having a first end adapted to be attached to a planter and a second end spaced from said first end; and wherein said means for adjusting the scraper blade comprises a first clamp structure clamped to said second end of the support rod for allowing sliding adjustment along said support rod and pivotal adjustment about said support rod, a second clamp structure attached to said first clamp structure for allowing pivotal adjustment about an axis extending in a nonparallel direction relative to the second end of said support rod, and said scraper blade attached to said second clamp structure with a threaded fastener that allows pivotal adjustment about an axis of the threaded fastener.

9. The adjustable scraper assembly according to claim 8, further comprising a protrusion member protruding from said first clamp structure in a nonparallel direction relative to the second end of said support rod, said second clamp structure being attached to said protrusion member for allowing pivotal adjustment about said protrusion member.

10. The adjustable scraper assembly according to claim 9, wherein said protrusion member extends from said first clamp structure in a generally perpendicular direction relative to the second end of the support rod.

11. The adjustable scraper assembly according to claim 10, wherein said second clamp structure comprises a second clamping block having a bore extending therethrough for receiving the protrusion member extending from said first clamp structure, and a threaded fastener for clamping the second clamping block to the protrusion member.

12. The adjustable scraper assembly according to claim 8, wherein said first clamp structure comprises a first clamping block having a bore extending therethrough for receiving the second end of the support rod, and a threaded fastener for clamping the first clamping block to the support rod.

13. An agricultural planter comprising:
 a planter frame;
 a gauge wheel arm pivotally attached to said planter frame;
 a gauge wheel attached to said gauge wheel arm; and
 an adjustable scraper assembly having a scraping edge positioned close to an outer circumference of said gauge wheel, said adjustable scraper assembly comprising:
  a support structure attached to said gauge wheel arm;
  a clamp assembly attached to said support structure; and
  a scraper blade comprising said scraping edge attached to said clamp assembly;
  said clamp assembly comprising means for pivotally adjusting the scraper blade about three nonparallel axes of rotation and for slidably adjusting the scraper blade in at least one linear direction relative to said support structure;

wherein said support structure comprises a support rod having a first end attached to said gauge wheel arm and a second end spaced from said first end; and wherein said means for adjusting the scraper blade comprises a first clamp structure clamped to said second end of the support rod for allowing sliding adjustment along said support rod and pivotal adjustment about said support rod, a second clamp structure attached to said first clamp structure for allowing pivotal adjustment about an axis extending in a nonparallel direction relative to the second end of said support rod, and said scraper blade attached to said second clamp structure with a threaded fastener that allows pivotal adjustment about an axis of the threaded fastener.

14. The agricultural planter according to claim 13, further comprising a protrusion member protruding from said first clamp structure in a nonparallel direction relative to the second end of said support rod, said second clamp structure being attached to said protrusion member for allowing pivotal adjustment about said protrusion member.

15. The agricultural planter according to claim 14, wherein said first clamp structure comprises a first clamping block having a bore extending therethrough for receiving the second end of the support rod, wherein said protrusion member extends from said first clamp structure in a generally perpendicular direction relative to the second end of the support rod, and wherein said second clamp structure comprises a second clamping block having a first bore extending therethrough for receiving the protrusion member extending from said first clamp structure and a second bore extending therethrough for receiving the threaded fastener that attaches the scraper blade to the second clamp structure.

\* \* \* \* \*